@(12) United States Patent
Pfeifer

(10) Patent No.: US 6,982,826 B2
(45) Date of Patent: Jan. 3, 2006

(54) MICROSCOPE

(75) Inventor: Gerhard Pfeifer, Solms (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 10/721,700

(22) Filed: Nov. 25, 2003

(65) Prior Publication Data

US 2005/0046931 A1 Mar. 3, 2005

(30) Foreign Application Priority Data

Sep. 1, 2003 (DE) .................................. 203 13 678 U

(51) Int. Cl.
*G02B 21/00* (2006.01)

(52) U.S. Cl. ...................................................... 359/381
(58) Field of Classification Search ................ 359/368, 359/381, 384, 819, 821
See application file for complete search history.

(56) References Cited

U.S. PATENT DOCUMENTS

RE37,445 E   *   11/2001   Schalz ........................ 359/368

FOREIGN PATENT DOCUMENTS

| JP | 2001208981 A | 8/2001 |
| JP | 2002090646 A | 3/2002 |
| JP | 2003029160 A | 1/2003 |

* cited by examiner

*Primary Examiner*—Mark A. Robinson
*Assistant Examiner*—Alessandro Amari
(74) *Attorney, Agent, or Firm*—Houston Eliseeva LLP

(57) ABSTRACT

The invention discloses a microscope (1) whose stand (2) comprises a transverse main section (3), a stand column section, and a stand base section (5). The stand (2) receives an element (25) that is rotatable about an axis and carries several optical elements (26). A flap (8) through which the rotatable element (25) is accessible is provided on the stand. The flap (8) coacts with a preloaded bolt element (28) in such a way that when the flap (8) is open, the bolt element (28) locks the rotatable element (25).

18 Claims, 5 Drawing Sheets

MICROSCOPE

RELATED APPLICATIONS

This application claims priority of the German utility model application 203 13 678.0 which is incorporated by reference herein.

FIELD OF THE INVENTION

The invention concerns a microscope. The invention concerns in particular a microscope having a stand, the stand receiving an element that is rotatable about an axis and carries at least one optical element.

BACKGROUND OF THE INVENTION

It is desirable to configure a microscope in such a way that dependable and user-friendly changing of the optical elements arranged on a rotatable element can be performed in reliable fashion. Particular attention is to be paid here to the user-friendliness and dependable operation of the microscope.

Japanese Patent Application 2001-208981 A discloses a microscope having a rotatable element that represents a filter cassette. The rotatable element is arranged within the stand of the microscope. Several optical elements can be mounted on the rotatable element. The optical elements can be, for example, filters, mirrors, or dichroic filters.

Japanese Patent 2002-090646 A discloses a method and an apparatus for monitoring a motor-driven part of a microscope. The motor drives a rotatable element on which several elements can be mounted. The document does not, however, give any indication as to how the rotatable element is secured upon changing of the optical elements, to make possible simple and reliable changing of optical elements.

Japanese Patent Application 2003-029160 A discloses a rotatable element on which several interchangeable optical elements can be mounted. With the rotatable element, the optical elements can be introduced into the beam path of a microscope. The rotatable element is arranged in the stand of a microscope. A bolt element coacts with the stand of the microscope and with the rotatable element in such a way that upon changing of the optical elements on the rotatable element, the latter can be immobilized in a fixed position. In addition, the rotatable element or a specific optical element arranged on the rotatable element can likewise be fixedly positioned in the beam path of the microscope using the bolt element. The apparatus proposed here has the disadvantage, however, that a user must personally release the lock made possible by the bolt element if he or she wishes, for example, to pivot another optical element into the beam path of the microscope.

SUMMARY OF THE INVENTION

It is the object of the invention to create a microscope with which optical elements on a rotatable element can be changed in simple and reliable fashion while guaranteeing dependable operation for a user. Retention should be accomplished as automatically as possible. The term "microscope" here encompasses both upright and inverted microscopes.

The aforesaid object is achieved by a microscope comprising: a stand, an element rotatable about an axis wherein the element is received by the stand and the rotatable element carries several optical elements; a flap provided at the stand, through which the rotatable element is accessible from the outside; and a preloaded bolt element which coacts with the flap in such a way that when the flap is open, the bolt element automatically locks the rotatable element.

The object is achieved as well by a microscope comprising: a stand, an element rotatable about an axis wherein the element is received by the stand and the rotatable element carries several optical elements; a flap provided at the stand, through which the rotatable element is accessible from the outside; and a preloaded pin which coacts with the flap in such a way that when the flap is open, the pin automatically locks the rotatable element.

The object is achieved as well by a microscope comprising: a stand, an element rotatable about an axis wherein the element is received by the stand and the rotatable element carries several optical elements; a flap provided at the stand, through which the rotatable element is accessible from the outside; and a preloaded lever which coacts with the flap in such a way that when the flap is open, the lever automatically locks the rotatable element.

The invention has the advantage that the microscope is equipped with a stand, and that the stand receives an element which is rotatable about an axis. In addition, the rotatable element carries several exchangeable optical elements. Access to the exchangeable optical elements is ensured by a flap that is provided on the stand of the microscope. The flap coacts with a preloaded bolt element in such a way that when the flap is open, the bolt element locks the rotatable element. The stand comprises a stand base section, a stand column section, and a transverse main section. It is particularly advantageous if the rotatable optical element is provided in the transverse main section.

The rotatable element carries several exchangeable optical elements. The optical elements can encompass optical deflection and/or filter systems that are embodied as beam splitter mirrors, beam splitter cubes, or the like. The exchangeability of the optical elements is guaranteed by the fact that the transverse main section has embodied an end face, and that the flap is provided in the end face. Opening the flap makes the rotatable element accessible, and the optical elements arranged on the rotatable element can be exchanged at will. As already mentioned above, upon opening of the flap a bolt element engages into the rotatable element in such a way that the latter is locked in terms of further rotary motion. This ensures that a user can reliably exchange the optical element or elements on the rotatable element, since the latter is securely immobilized in its position by the engaged bolt element. A further advantage results from the fact that the locking of the optical element is automatically canceled by closing the flap. The motor associated with the rotatable element can then, depending on the setting of the microscope, deliver the desired optical element into the beam path.

In a particular embodiment, the rotatable element is movable or rotatable in motorized fashion. Locking of the rotatable element by the bolt element has the advantage that during exchange of an optical element, there is no change in the location of the motor so that any data indicating its position are lost or misinterpreted.

Further advantageous embodiments of the invention are evident from the dependent claims.

BRIEF DESCRIPTION OF THE DRAWINGS

The drawings schematically depict the subject matter of the invention and will be described below with reference to the Figures, in which.

DETAILED DESCRIPTION OF THE INVENTION

Figure 1:
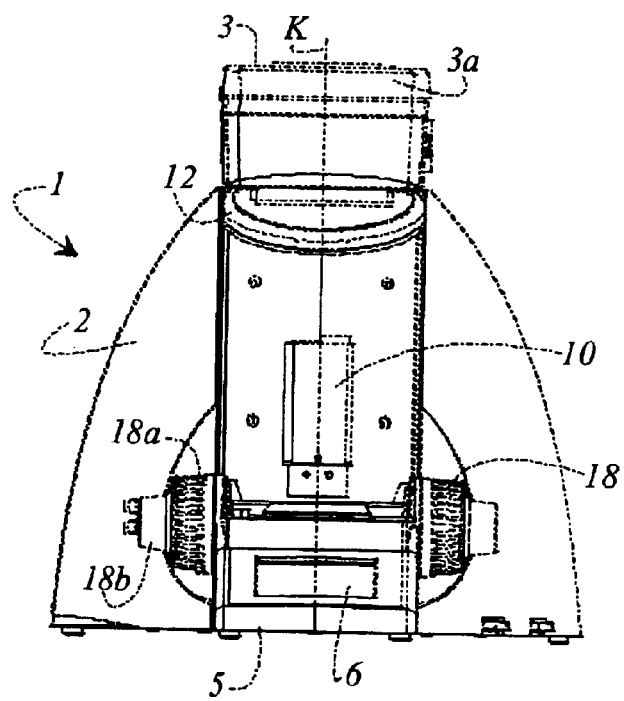
FIG. 1 is a frontal view of the microscope according to the present invention.
Figure 2:
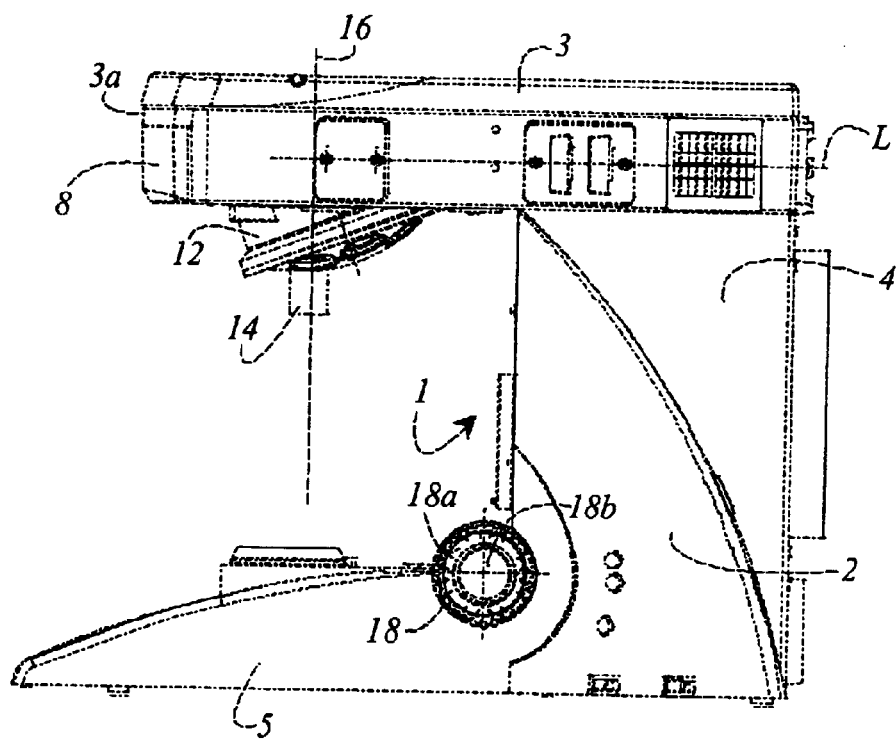
FIG. 2 is a side view of the microscope according to the present invention.

FIG. 1 is a frontal view of microscope 1. Microscope 1 encompasses a stand 2 that comprises a transverse main section 3, a stand column section 4, and a stand base section 5. A microscope stage holding element 10 is provided on stand column section 4. A display 6, with which a user can make adjustments to microscope 1, is provided in stand base section 5. FIG. 2 is a side view of microscope 1 according to the present invention. For the sake of simplicity, the same reference characters as in FIG. 1 are also used in FIG. 2. Stand transverse main section 3 defines an end face 3a. In transverse main section 3, there is provided on end face 3a a flap 8 that can be opened by a user in order thereby to gain access to the interior of stand 2 and of transverse main section 3. Transverse main section 3 also carries a rotatable nosepiece 12. Rotatable nosepiece 12 carries at least one objective 14 that, in the working position, defines an optical axis 16. Stand 2 furthermore carries a rotatable operating element 18 with which the focus position in the Z direction can be modified. Operating element 18 encompasses a first operating element 18a with which a coarse displacement in the Z direction is possible, and a second operating element 18b with which a fine displacement in the Z direction is possible.

Figure 3:
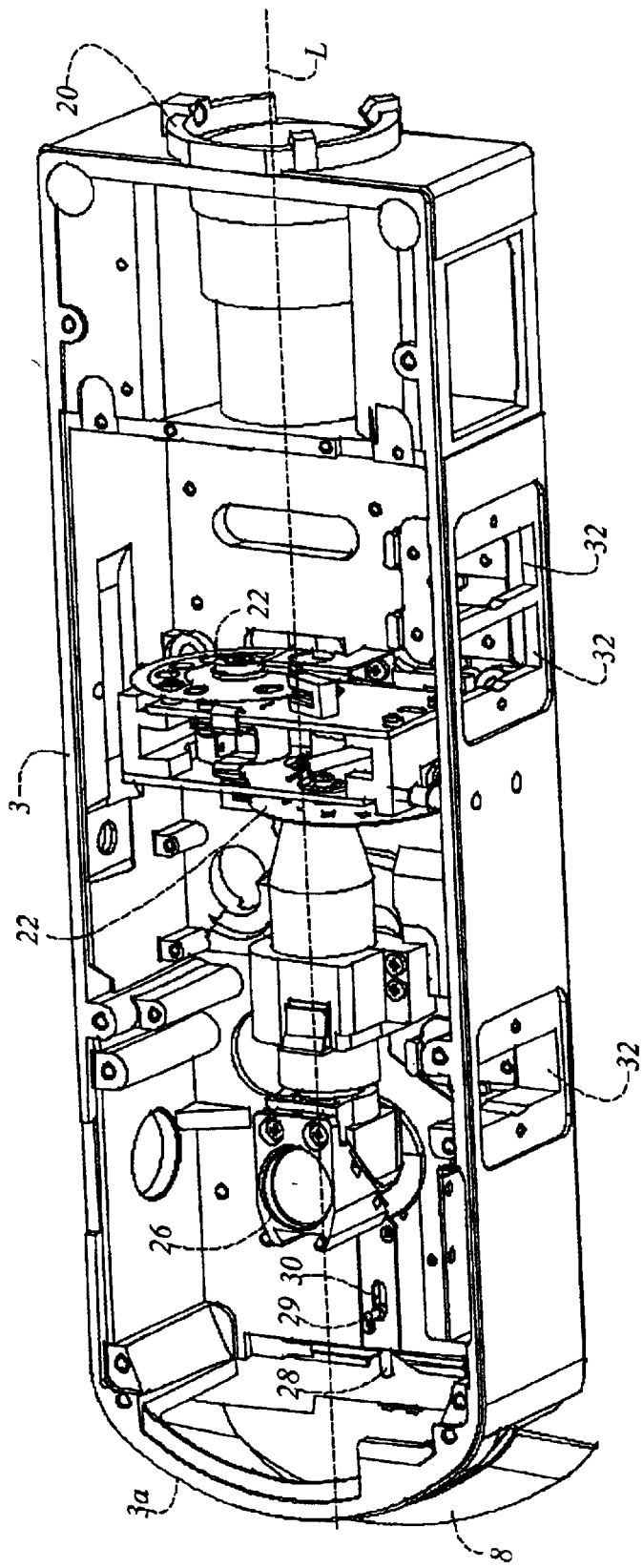
FIG. 3 is a perspective view of the transverse main section of the microscope, providing a view into the interior of the transverse main section.

FIG. 3 is a perspective view of transverse main section 3 of microscope 1. The perspective depiction allows a view into the interior of transverse main section 3. Provided on end face 3a of transverse main section 3 is a flap 8 which, in this depiction, is shown pivoted. Opposite flap 8, transverse main section 3a possesses a flange 20 to which an illumination device (not depicted) can be attached. Several optical elements 22, which can be brought in suitable fashion into illuminating light beam L, are also provided in the interior of transverse main section 3. The illumination beam path is defined by the light source attached to flange 22 [sic]. For better clarity, rotatable element 25 is not shown in the depiction of FIG. 3. In the embodiment depicted here, rotatable element 25 would be arranged directly behind flap 8 on end face 3a of transverse main section 3. Of the several optical elements 26 that can be provided on rotatable element 25, one is arranged in the position that directs illuminating light beam L of the light source through objective 14 of microscope 1. A bolt element 28 that is mechanically preloaded is provided in the region of end face 3a of transverse main section 3. The mechanical preloading of bolt element 28 allows the latter to transition automatically into a locking position when a force is not exerted. In the embodiment shown here, bolt element 28 is embodied as a pin 50 (see FIG. 6) on which is shaped a lug 29 that is guided in a slot 30 of transverse main section 3. Transverse main section 3 moreover possesses several openings 32 through which optical elements can be introduced into the beam path of illuminating light L. A further embodiment of bolt element 28 is a lever 60.

Figure 4:
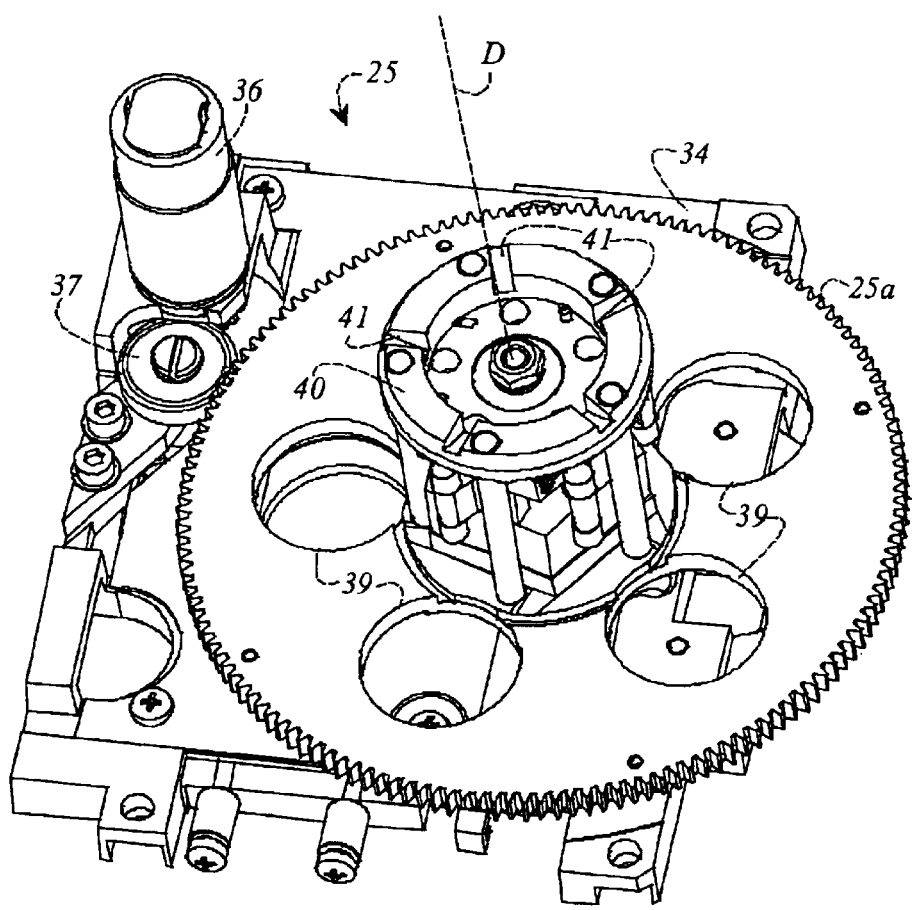
FIG. 4 is a perspective view of a rotatable element that can be arranged in the interior of the stand or the transverse main section.

FIG. 4 is a perspective view of rotatable element 25 that can be used in the region of end face 3a of transverse main section 3. Rotatable element 25 is arranged on a mounting plate 34. Also provided on mounting plate 24 is a motor 36 whose rotary motion is transferred via a transfer wheel 37 to rotatable element 25. Rotatable element 25 is rotatable about an axis D. In the embodiment depicted here, the rotatable element is embodied in a circular shape and has on its periphery a toothed ring 25a. The rotary motion of motor 36 is thus transferred via at least one gear to toothed ring 25a of rotatable element 25. A cylindrical element 40 is arranged on rotatable element 25 symmetrically about axis D. Optical elements 26 can be mounted on cylindrical element 40 (see FIG. 5). Rotatable element 25 furthermore possesses several openings 39 through which it is possible for the light of illuminating light beam L to pass. Cylindrical element 40 possesses, on the side facing away from rotatable element 25, several grooves 41. Bolt element 28 engages into grooves 41, thereby locking or blocking further rotation of rotatable element 25. In the embodiment of pin 50 as bolt element 28 as shown in FIG. 3, lug 29 joined to pin 50 would engage into grooves 41 of cylindrical element 40.

Figure 5:
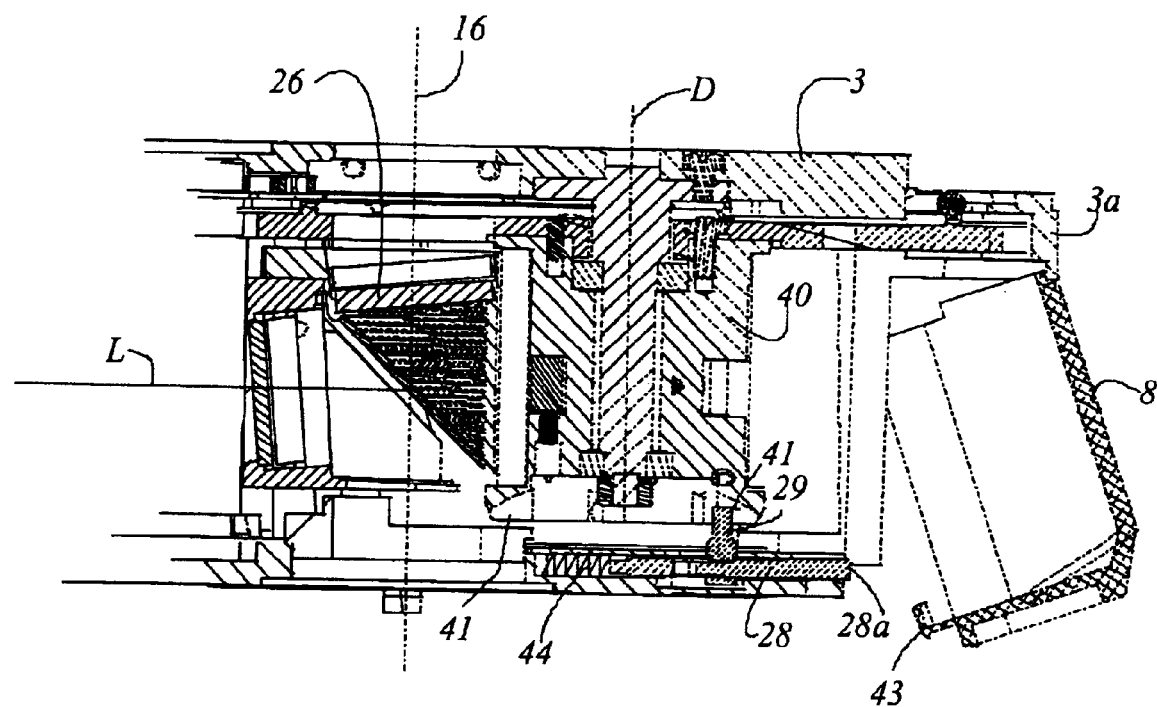
FIG. 5 is a partial view of the end face of the transverse main section, the flap on the end face being open.

FIG. 5 is a partial view of end face 3a of transverse main section 3. In this depiction, flap 8 on end face 3a is partly swung away in order to illustrate the coaction of bolt element 28 with grooves 41 of cylindrical element 40. Cylindrical element 40 is rotatable about axis D. In the embodiment depicted here, an optical element 26 that deflects the light of illuminating light beam L into optical axis 16 of microscope 1 is mounted on cylindrical element 40. Flap 8 on end face 3a of transverse main section 3 is here shown pivoted, in order to illustrate the coaction of flap 8 with bolt element 28. Flap 8 can, however, be completely removed by the user in order to gain access to the interior of transverse main section 3, so that optical elements 26 can be mounted on cylindrical element 40 or removed therefrom. Flap 8 possesses an extension 43 that coacts with a front surface 28a of bolt element 28.

Figure 6:
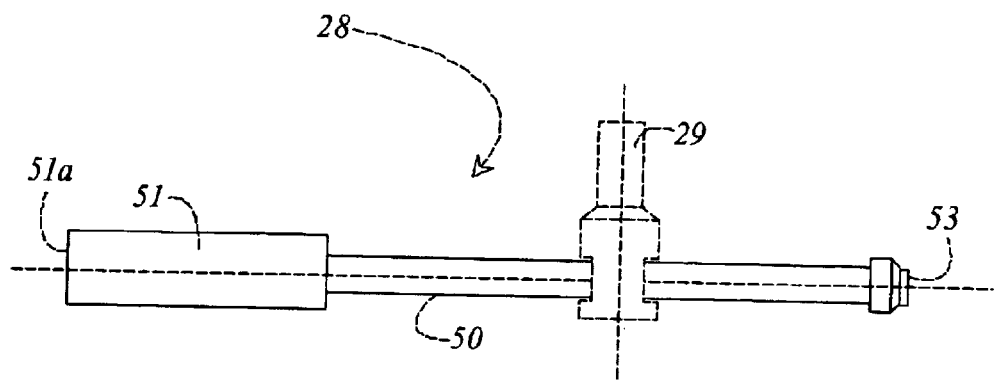
FIG. 6 is a detail view of the bolt element, which is configured in this embodiment as a pin.

In the embodiment depicted in FIG. 6, bolt element 28 is configured as a pin 50. Bolt element 28 is provided with a lug 29 that protrudes perpendicularly from pin 50. As already described in FIG. 3, lug 29 engages through a slot 30. Bolt element 28 or pin 50 is impinged upon by a spring 44, so that when flap 8 is removed, bolt element 28 is moved in the direction of end face 3a of transverse main section 3 so that bolt element 28 or lug 29 engages into one of grooves 41 of the cylindrical element. When flap 8 is open, cylindrical element 40 is thus locked in terms of rotary motion or any change in position due to rotation. When flap 8 is closed, bolt element 28 is pushed away from end face 3a of transverse main segment 3 by extension 43 of flap 8. Bolt element 28 and lug 29 come out of engagement with grooves 41, and rotatable element 25 can be freely rotated, e.g. by motor 36, into the desired position.

The configuration of bolt element 28 as pin 50 is depicted in FIG. 6. Pin 50 encompasses lug 29 mounted perpendicularly on it. The pin is furthermore equipped with an extender element 51 which has an end surface 51a on which extension 43 of flap 8 engages. Spring 44 engages on end 53 of pin 50 that is opposite to end surface 51a. Lug 29 is thread-joined to pin 50. This thread join can be additionally secured with an adhesive.

Figure 7:
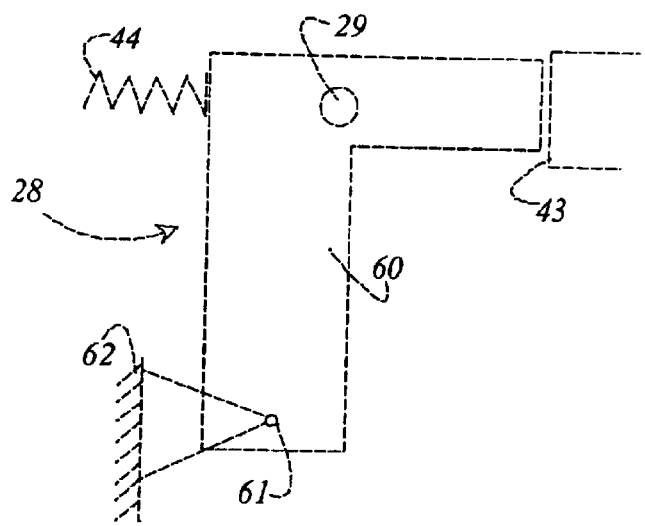
FIG. 7 is a detail view of the bolt element, which is configured in this embodiment as a lever.

FIG. 7 is a detail view of bolt element 28, which in this embodiment is configured as lever 60. Lever 60 is mounted pivotably about a shaft 61, the shaft being articulated on housing 62 of the microscope. Lug 29 is mounted on lever 60 and, when the position of lever 60 is suitable, engages into one of grooves 41 of cylindrical element 40. When flap 8 is open, cylindrical element 40 is thus locked in terms of any rotary motion or change in position due to rotation. When flap 8 is closed, lever 60 is pushed by extension 43 of flap 8 away from an end face 3a of transverse main section 3. Spring 44 impinges upon lever 60 in the direction of extension 43.

What is claimed is:

1. A microscope comprising: a stand, an element rotatable about an axis wherein the element is received by the stand and the rotatable element carries several optical elements; a flap provided at the stand, through which the rotatable element is accessible from the outside; and a preloaded bolt element which coacts with the flap in such a way that when the flap is open, the bolt element automatically locks the rotatable element.

2. The microscope as defined in claim 1, wherein the bolt element is a pin.

3. The microscope as defined in claim 1, wherein the bolt element is a lever.

4. The microscope as defined in claim 1, wherein the stand comprises a stand base section, a stand column section, and a transverse main section, the rotatable element being provided in the transverse main section.

5. The microscope as defined in claim 4, wherein the transverse main section has embodied an end face; and the end face is equipped with the flap through which the rotatable element is accessible.

6. The microscope as defined in claim 1, wherein the rotatable element serves to receive at east one exchangeable optical element.

7. The microscope as defined in claim 1, wherein the rotatable element is rotatable in motorized fashion.

8. The microscope as defined in claim 1, wherein the rotatable element is equipped with a cylindrical element that serves to receive at least one optical element; and the cylindrical element has several grooves into which the bolt element engages and locks the rotatable element.

9. A microscope comprising: a stand, an element rotatable about an axis wherein the element is received by the stand and the rotatable element carries several optical elements; a flap provided at the stand, through which the rotatable element is accessible from the outside; and a preloaded pin which coacts with the flap in such a way that when the flap is open, the pin automatically locks the rotatable element.

10. The microscope as defined in claim 9, wherein the rotatable element is equipped with a cylindrical element that serves to receive at least one optical element; and the cylindrical element has several grooves into which the pin engages and locks the rotatable element.

11. The microscope as defined in claim 10, wherein the pin is equipped with a lug that protrudes perpendicularly from the pin, the lug penetrating through a slot so that the pin is guided by the slot; and the lug of the pin engages into at least one groove of the cylindrical element and locks the rotatable element.

12. The microscope as defined in claim 9, wherein the pin is impinged upon by a spring in such a way that when the flap is removed, the pin is movable in the direction of an end face of a transverse main section of the microscope.

13. The microscope as defined in claim 12, wherein when the flap is closed, a front surface of the pin coacts with an extension of the flap in such a way that the pin is pushed away from the end face of the transverse main section and the spring is compressed.

14. A microscope comprising: a stand, an element rotatable about an axis wherein the element is received by the stand and the rotatable element carries several optical elements; a flap provided at the stand, through which the rotatable element is accessible from the outside; and a preloaded lever which coacts with the flap in such a way that when the flap is open, the lever automatically locks the rotatable element.

15. The microscope as defined in claim 14, wherein the rotatable element is equipped with a cylindrical element that serves to receive at least one optical element; and the cylindrical element has several grooves into which the lever engages and locks the rotatable element.

16. The microscope as defined in claim 15, wherein the lever is equipped with a lug that protrudes from the lever, the lug engaging into at least one groove of the cylindrical element and locking the rotatable element.

17. The microscope as defined in claim 14, wherein the lever is impinged upon by a spring in such a way that when the flap is removed, the lever pivots in the direction of an end face of a transverse main section of the microscope.

18. The microscope as defined in claim 17, wherein when the flap is closed, the lever coacts with the extension of the flap in such a way that the lever is pushed away from the end face of the transverse main section and the spring is compressed.

* * * * *